United States Patent [19]

Buczak

[11] 4,056,875
[45] Nov. 8, 1977

[54] ASSEMBLING HAND GRIPS ONTO HANDLES

[76] Inventor: Edwin J. Buczak, 145 Wildwood Ave., Worcester, Mass. 01603

[21] Appl. No.: 702,021

[22] Filed: July 2, 1976

[51] Int. Cl.² .......................................... B23P 19/04
[52] U.S. Cl. ...................................... 29/234; 29/280; 29/282
[58] Field of Search ................. 29/234, 280, 278, 282

[56] References Cited
U.S. PATENT DOCUMENTS

| 2,426,401 | 8/1947 | Mack | 29/234 |
| 2,940,164 | 6/1960 | Davis | 29/234 X |
| 3,672,028 | 6/1972 | Boling | 29/282 |

Primary Examiner—James L. Jones, Jr.
Assistant Examiner—J. T. Zatarga
Attorney, Agent, or Firm—Charles R. Fay

[57] ABSTRACT

Mechanism for assembling plastic hand grips onto metal handles including means holding a metal handle in alignment with the grip at an open end of the latter, including a guide at the open end of the grip for the forward end of the handle, and a movable bar for moving the handle to force it into the grip in tight relationship therewith and at the same time forcing the guide for the forward end of the handle down and out of the way for full insertion of the handle.

5 Claims, 6 Drawing Figures

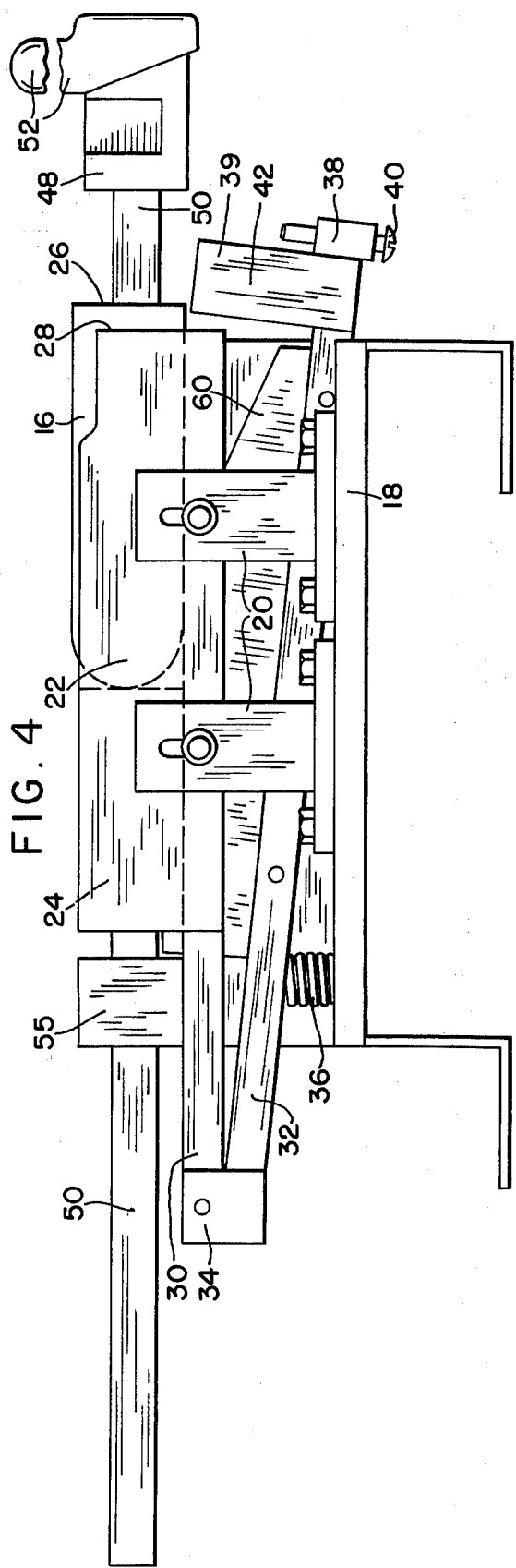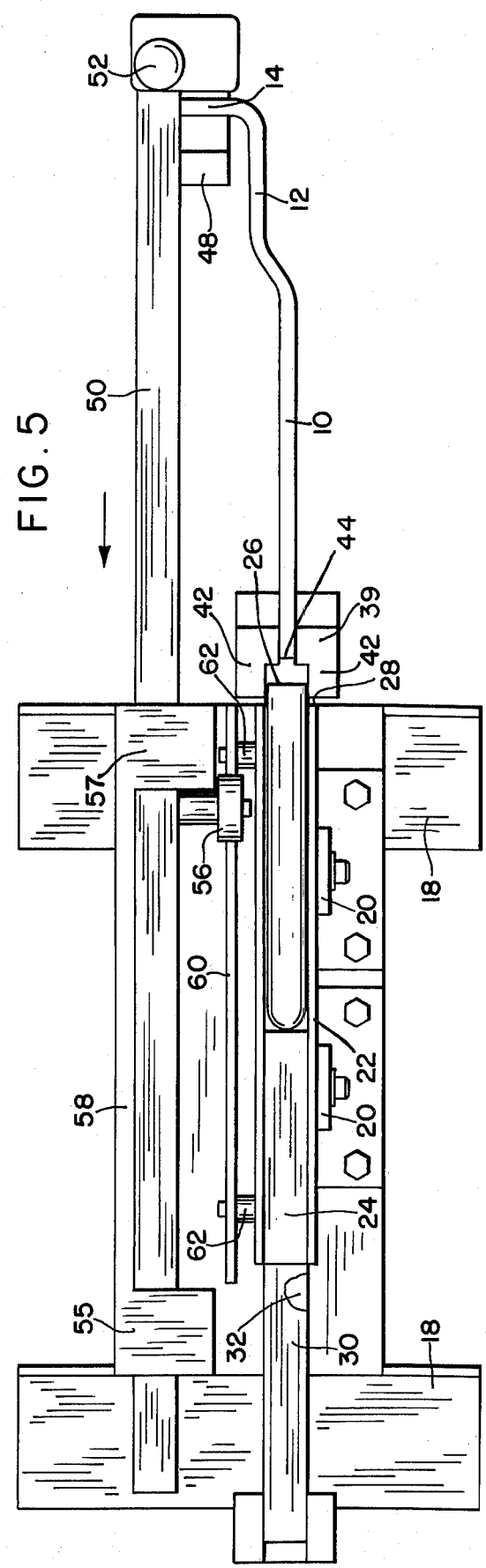

ASSEMBLING HAND GRIPS ONTO HANDLES

BACKGROUND OF THE INVENTION

Plastic hand grips are presently assembled onto metal handles by hand with no kind of mechanical aid, and because of the flexibility and rubbery characteristics of the plastic of the grips (vinyl), the assembly workers experience difficulty forcing the grips onto the metal handles. A sustained production schedule cannot be maintained and the consequences of so handling the pieces result in worker fatigue and soreness of hands.

The present invention provides a simplified mechanical assembly device providing greatly increased production without discomfort to the operator.

SUMMARY OF THE INVENTION

A machine for applying sheath-like plastic grips to free ended handles for certain tools, comprising a base, means for holding the grip with its open end facing in a certain direction, a bar slidable on said base, said bar including means for holding the free ended handle, and guide means to support the free end of the handle adjacent the open end of the grip together with means for causing said guide means to move out of the way to allow the handle to be seated fully home in said grip as the slidable bar is moved manually in the opposite direction.

BRIEF DESCRIPTION OF THE FIGURES

FIG. 4 is a view similar to FIG. 3 but showing the parts assembled and the guide in out of the way position;
FIG. 5 is a top plan view of FIG. 3.

PREFERRED EMBODIMENT OF THE INVENTION

A metal handle 10, in this case flat and having an offset 12 and a further offset 14, is to be provided with a vinyl grip 16 which is in the form of a sheath to be applied to the tool handle 10 in such a way and with such tolerances that it is very difficult to thereafter remove the grip from the handle.

Figure 3:
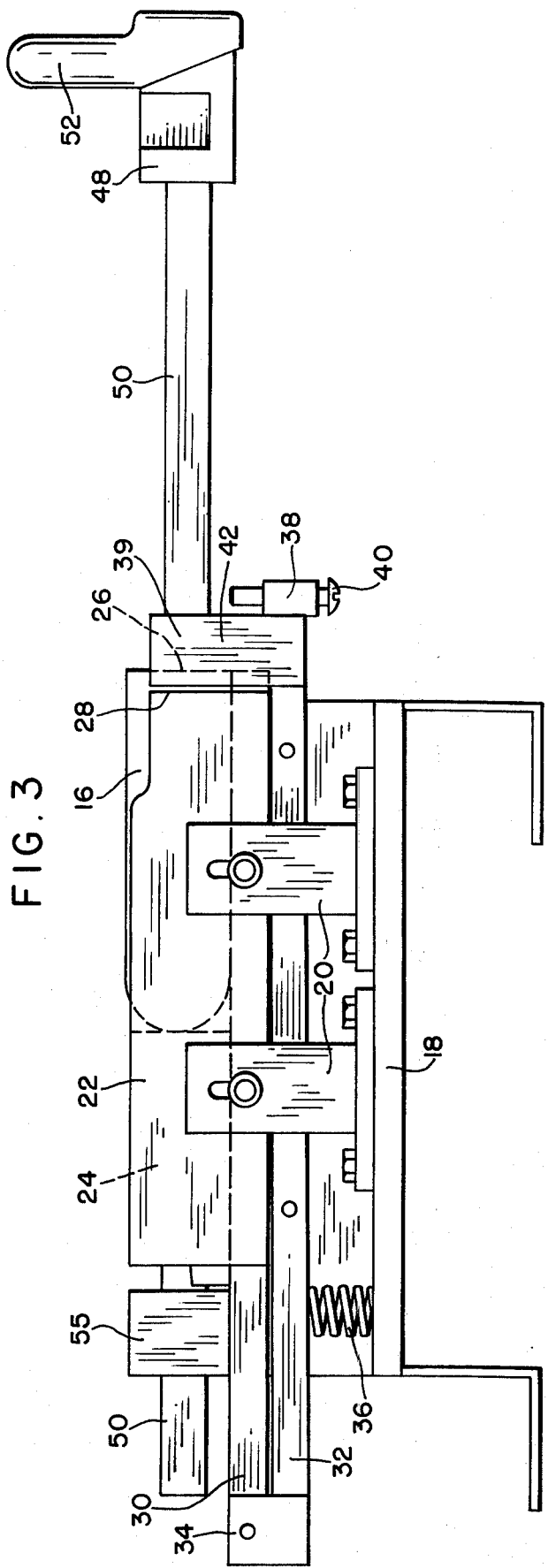
FIG. 3 is a view in side elevation illustrating the machine set to assemble the handle and grip.

Referring now to FIGS. 3, 4 and 5, there is provided a base 18 of any description upon which are mounted uprights as for instance at 20 and on these uprights there is adjustably mounted an open top trough generally indicated at 22, the open top of the trough being shown in FIG. 5. This trough is blocked at one end as at 24 and the grip 16 is dropped into it with the open end of the grip as at 26 extending longitudinally therefrom at the right hand end 28 of the trough. The trough has a bottom holding the grip in a horizontal position so that it is ready to have the handle 10 inserted therein, the grip 16 always remaining in fixed position in its trough, the various parts of which may be adjustable to accept troughs of different sizes and shapes.

The trough has secured thereto a bar 30 which extends to the left as shown in FIGS. 3 to 5 inclusive and it mounts a pivoted bar 32 underneath it, the pivoted bar 32 being pivoted thereto as at for instance 34. A spring of any kind as shown at 36 is used to normally maintain bar 32 in parallel condition with respect to bar 30 as shown in FIG. 3.

Bar 32 extends to the right hand end of the machine terminating at 38 where it may be provided with an adjusting screw 40 for supporting handle of different widths. On bar 32 adjacent its end 38 there is a guide 39. This guide is made up of two separated parts 42—42, see FIG. 5. This guide partially receives the open end 26 of the grip 16 so that this open end is not capable of lateral motion, i.e. the guide 39 being in its up position as shown in FIG. 3.

The guide parts 42—42 also hold the forward end 44 of the tool handle 10 aligning it with the open end 26 of the grip 16.

The grip 16 and the free end of the tool handle are thereby aligned, the offset 12 being located in a fixture 48 on the bar 50, the latter having a pusher handle 52 for the convenience of the operator. Bar 50 is slidably mounted in posts 55-57 mounted on an upright plate 58 in turn mounted on the base 18, and it may be moved from its right hand position in FIG. 5, to the left hand position of FIG. 4, and in so doing the metal handle 10 is pressed completed into and solidly associated inside the grip 16.

Figure 1:
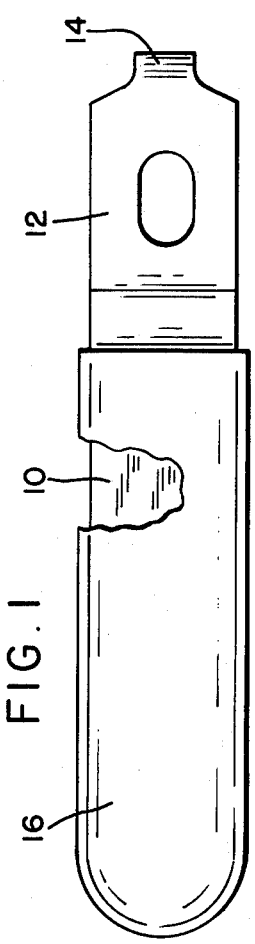
FIG. 1 is a view in elevation with part cut away illustrating a form of plastic grip applied to a metal handle.
Figure 2:
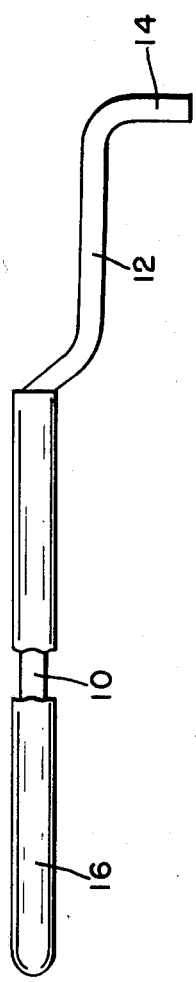
FIG. 2 is an edge view thereof.
Figure 6:
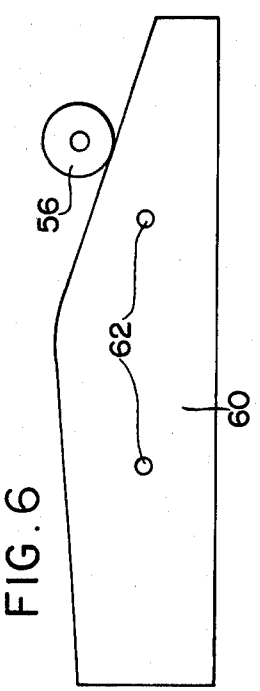
FIG. 6 is a detail of the cam and its actuator.

As shown in FIG. 5 the bar 50 has mounted on it a cam roller 56 and fixed with respect to the bar 32 is a cam plate 60 by any desired means such as a pair of lateral pins 62—62. The outline of the cam 60 is shown in FIG. 6 and its relative relation with respect to the cam roller 56 is also shown. The result of this construction is that as bar 50 is moved to the left from the FIG. 3 to the FIG. 4 position, the cam plate 60 is pivoted down by the cam roller 56 and in so doing moves bar 32 down with it, thereby moving the parts 42 of guide 39 down and out of the way so that the metal handle 10 can be thrust fully home with respect to the grip.

As the bar 50 is then retracted, the spring 36 brings up cam 60, bar 32, and guide parts 42, the latter serving to knock off the now grip clad handle which falls by gravity into a container or conveyor not shown.

I claim:

1. A machine for applying open ended grips to free ended handles comprising a base, means receiving a grip with an open end in a predetermined position, a sliding bar, means for holding an end of a handle on the sliding bar in a position to have a free end of the handle associated with the open end of the grip,
   a guide aligning the free end of the handle with the open end of the grip, and means on the bar moving the guide out of the way as the bar is moved to thrust the handle into the grip,
   said guide also including means for engaging the sides of the grip to position the open end of the same laterally with respect to the free end of said handle.

2. The machine of claim 1 wherein the means moving the guide out of the way comprises a cam and a cooperating follower on the guide.

3. The machine of claim 1 including a pivoted bar mounting said guide, the means moving the guide out of the way including a fixed cam for pivoting said bar out of the path of the tool handle.

4. The machine of claim 3 wherein said cam is mounted on said pivoted bar and there is a cam actuator on the sliding bar mounting the handle for assembly to the grip.

5. The machine of claim 4 wherein said guide is in two spaced parts to receive between them the free end of the handle.

* * * * *